United States Patent [19]

Yarkosky et al.

[11] Patent Number: 5,437,887

[45] Date of Patent: Aug. 1, 1995

[54] METHOD OF PREPARING ALUMINUM MEMORY DISKS

[75] Inventors: Eugene F. Yarkosky, Milford; Deborah Friday, Rocky Hill; Patricia A. Cacciatore, Prospect, all of Conn.

[73] Assignee: Enthone-Omi, Inc., West Haven, Conn.

[21] Appl. No.: 172,418

[22] Filed: Dec. 22, 1993

[51] Int. Cl.$^6$ .................................... H01F 10/02
[52] U.S. Cl. .................................... 427/131; 427/132; 427/406; 427/443.1; 428/900; 428/928; 428/611
[58] Field of Search ................ 427/129–132, 427/443.1, 443.2, 406; 204/192.2; 428/900, 928

[56] References Cited

U.S. PATENT DOCUMENTS

| 2,658,841 | 11/1953 | Gutzeit et al. | 117/130 |
|---|---|---|---|
| 2,884,344 | 4/1959 | Ramirez | 117/130 |
| 3,930,081 | 12/1975 | Shinomiya et al. | 427/421 |
| 3,953,624 | 4/1976 | Arnold | 427/256 |
| 3,953,654 | 4/1976 | Feldstein | 428/471 |
| 4,125,648 | 11/1978 | Vratny | 427/305 |
| 4,128,691 | 12/1978 | Shirahata et al. | 428/336 |
| 4,160,049 | 7/1979 | Narcus | 427/277 |
| 4,189,324 | 2/1980 | Gulla et al. | 106/1.22 |
| 4,224,133 | 9/1980 | Takahashi | 204/290 |
| 4,250,225 | 2/1981 | Shirahata et al. | 428/336 |
| 4,563,371 | 1/1986 | Sirinyan et al. | 427/305 |
| 4,567,066 | 1/1986 | Schultz | 427/305 |
| 4,666,786 | 5/1987 | Yano et al. | 428/544 |
| 4,670,312 | 6/1987 | Ehrsam | 427/438 |
| 4,673,468 | 6/1987 | Myers et al. | 204/24 |
| 4,699,811 | 10/1987 | Kunces | 427/259 |
| 4,954,370 | 9/1990 | Mahmoud | 427/438 |
| 5,141,778 | 8/1992 | Yarkosky et al. | 427/304 |

FOREIGN PATENT DOCUMENTS 328970 8/1991 Japan .

OTHER PUBLICATIONS

M. Schwartz and G. Mallory, "Effect of Heat-Treatment on Magnetic Properties of Electroless Nickel Alloys", J. Electrochem Soc.: vol. 123, No. 5, pp. 606–614, May 1976.

Saad K. Doss and P. B. P. Phipps, "Process for the Preparation of Electroless Nickel with Superior Thermal Stability" Platng and Surface Fininshing, Apr. 1985, pp. 64–67.

Koiwa, Usoda, Yamada and Osaka, "Effect of Heat Treatment on Properties of Electroless Deposited Ni–Mo–P Alloy Films" J. Electrochemical Society, vol. 135, No. 3, Mar. 1988, pp. 718–726.

J. B. Hajdu, E. F. Yarkosky, S. Kawashima, H. Nakao, H. Iwasawa "Magnetic Induction in Electroless Nichkel Deposits for Aluminum Memory Disks", presented at the Second Int. Symposium on Magnetic Materials, Processor and Devices sponsored by IBM, Oct. 13–18, 1991, Phoenix, Ariz.

G. Kline, P. Cacciatore, E. Yarkosky "Improved Thermal Stability of Electroless Nickel Deposit for Magnetic Thin Film Memory Disks", presented at the Electrochemical Society, Inc. meeting held in Honolulu, Hawaii, May 16–21, 1993.

Primary Examiner—Bernard Pianalto
Attorney, Agent, or Firm—DeLio & Peterson

[57] ABSTRACT

A method is provided for producing paramagnetic electroless nickel-phosphorus (ENP) coatings on zincated aluminum substrates using an ENP bath containing antimony and/or cadmium ions and/or an adjusting operating pH, which coated substrates have enhanced retention of their paramagnetic properties after being exposed to elevated temperatures on the order of 310° C. as, for example, when the ENP coated substrate is further treated by sputtering operations to form another metal layer on the coated substrate to produce magnetic memory disks.

15 Claims, No Drawings

METHOD OF PREPARING ALUMINUM MEMORY DISKS

BACKGROUND OF THE INVENTION

1. Field of the Invention

This invention relates to the metal plating of zincated aluminum and, more particularly, to providing an aluminum memory disk having magnetic properties which are substantially unchanged by heating of the disk during its manufacture.

Metal plating of aluminum is of considerable commercial interest and one application is the preparation of memory disks which are used in a variety of electronic applications such as computer and data processing systems. Aluminum is the preferred substrate for the disk although other suitable metals may be employed. Typical alloys used for memory disks are FP-3, CZ-46 and Aluminum Association Numbers 5086 and 5586. Generally, the aluminum disks are about 1.25 to 5 mm. thick and contain, by weight, about 4% to 4.9% magnesium, 0.01% to 0.4% each of copper, zinc, chromium, nickel, iron and silicon and the balance aluminum and inevitable impurities. U.S. Pat. No. 4,840,685 shows a number of other aluminum alloys suitable for disks.

In general, the disk manufacturing process involves preparing the aluminum surface, e.g., zincating, followed by depositing a paramagnetic sublayer of electroless nickel phosphorus (ENP) which is used as the base for a thin layer of ferromagnetic material, i.e., Co, Co-NiCr, etc. usually applied by sputtering. As plated ENP deposits in excess of about 9% by weight phosphorus are paramagnetic but these deposits lose their amorphous structure and become ferromagnetic above about 290° C. Elevated temperatures on the order of 310° C. can be reached during the sputtering process and at increasing temperatures even more thermally stable ENP deposits are required. By "ENP" is meant herein to be a electroless nickel deposit containing greater than about 9% by weight phosphorus.

The memory disk industry requires that the ENP deposits remain substantially nonmagnetic, e.g., less than 5 gauss and preferably at its original level of less than 2 gauss because if the deposit is ferromagnetic it would interfere with the read/write modes by diluting signal and increasing noise levels.

This requirement has received attention in the industry and a number of articles have been written addressing this matter. M. Schwartz and G. Mallory, "Effect of heat-treatments on magnetic properties of electroless nickel alloys, *J. Electrochem Soc.:* Vol. 123, No. 5, pages 606–614, May 1976; Saad K. Doss and P. B. P. Phipps, "Process for the preparation of electroless nickel with superior thermal stability" Plating and Surface Finishing, April 1985, pages 64–67; Koiwa, Usoda, Yamada and Osaka, "Effect of heat treatment on properties of electroless deposited nickel Ni-Mo-P alloy films" *J. Electrochemical Society,* Vol. 135, No. 3, March 1988, pages 718–726; and J. B. Haydu, E. F. Yarkosky, S. Kawashima, H. Nakao, H. Iwasawa "Magnetic induction in EN deposits for aluminum memory disk", presented at the Second Int. Symposium on Magnetic Materials, Processor and Devices sponsored by IBM, Oct. 13-18, 1991, Phoenix, Ariz.

In the Doss and Philips article it is demonstrated that the introduction of boron in ENP films generally enhanced their paramagnetic thermal stability. In general, the annealing temperatures at which the ENP films became ferromagnetic were found to be higher as the boron content of the film was increased. Boron was introduced in the deposit by adding dimethylamine borane (DMAB) to the electroless nickel plating solution. Typical deposits contained 87 to 88% by weight nickel, 11 to 12% phosphorus, about 1% copper and up to 1% boron. Similar results for boron containing ENP deposits are shown in U.S. Pat. No. 3,953,654.

It is an object of the present invention to provide a method for preparing metal plated aluminum substrate articles wherein retention of their original magnetic properties after exposure to elevated temperatures is enhanced.

It is a further object of the present invention to provide metal plated aluminum substrate articles such as memory disks wherein retention of the original paramagnetic properties of the electroless metal plating, e.g., ENP, after exposure to elevated temperatures is enhanced.

Other objects and advantages will become apparent from the following detailed description.

For convenience, the following description will be directed to double zincated aluminum substrates and electroless nickel plating baths although it will be clear to those skilled in the art that other suitable protective coatings and metal plating baths may be employed.

SUMMARY OF THE INVENTION

It has been found that ENP plated aluminum substrate articles may be prepared wherein retention of the original magnetic properties (paramagnetic) of the ENP metal plating after exposure to elevated temperatures is enhanced. The method comprises applying a protective layer on the aluminum alloy substrate such as a zincate coating, followed by plating the aluminum substrate using an ENP plating bath containing an effective amount of an additive material selected from the group consisting of antimony ions and cadmium ions. In general, the additives are present in an amount of about 0.1 to 20 ppm or more and any ENP plating bath may be employed.

It has also been found that operating an ENP bath at a reduced pH is advantageous for the retention of the paramagnetic properties of the deposit after heating.

In a highly preferred embodiment, multiple metal plating baths are employed whereby the zincated aluminum substrate is plated using an ENP plating bath containing the additive (or having an adjusted pH) to form a thin metal layer followed by plating a thicker coating from a second conventional ENP electroless plating bath, with or without the additive component. A similar dual plating bath process is described in U.S. Pat. No. 4,567,066 granted to P. B. Schultz and E. F. Yarkosky, which patent is hereby incorporated by reference.

DESCRIPTION OF THE PREFERRED EMBODIMENT(S)

The single and double zincate methods for preparing aluminum for metal plating are well-known in the art. In general, any aluminum or aluminum alloy may be treated using the method of the invention and exemplary alloys are 5086, 5586, FP-3 and CZ-46. The aluminum may be wrought or cast.

While the specific double-zincate method employed may vary according to the alloys treated and the claimed results, a typical procedure used in industry is as follows and it should be understood that water rinses are generally employed after each processing step.

The first step is usually to clean the aluminum surface of grease and oil and an alkaline nonetch cleaner such as ENBOND® NS-35 or ENBOND 5979 sold by Enthone-OMI, Inc., New Haven, Conn., may be suitably employed. ENBOND NS-35 is a nonsilicated mildly alkaline cleaner and ENBOND 5979 is a silicated cleaner both of which are used over a temperature range of about 49° to 66° C. for 1 to 5 minutes.

Etching of the cleaned aluminum may then be performed using etchants such as ACTANE® E-10, ENBOND E-14 or ENBOND E-24, all of which are sold by Enthone-OMI. These materials are either acidic or alkaline. The acid etchant is generally preferred particularly when surface dimensions, tolerances and integrity are important. The etchants are generally used at elevated temperatures of about 49° to 66° C. for 1 to 3 minutes.

De-smutting of the alloy may be performed using a $HNO_3$ solution (for example 50% by volume) or mixtures of $HNO_3$ and $H_2SO_4$ alone or in combination with ACTANE 70 sold by Enthone-OMI. ACTANE 70 is an acidic, fluoride salt product containing ammonium bifluoride. A typical de-smutting solution contains 25% by volume $H_2SO_4$, 50% by volume $HNO_3$ and 1 lb./gallon ACTANE 70 in water and are generally used at room temperature for 1-2 minutes.

It is at this point that a zincate coating is applied to the aluminum by immersion in a zincate bath as described in Saubestre, U.S. Pat. No. 3,216,835. A preferred bath due to its demonstrated effectiveness is ALUMON® EN sold by Enthone-OMI. ALUMON EN contains an alkali metal hydroxide, a zinc salt (such as zinc oxide, zinc sulfate, etc.), a chelating agent, optionally anionic wetting agents and metallic additives. Generally, the double zincate process involves immersion of the aluminum substrate in a dilute zincate bath such as ALUMON EN for a period of 35-60 seconds followed by a thorough cold water rinse, a zinc stripping operation in nitric acid, e.g., 50% by volume for 1 minute at room temperature, a further cold water rinse, and a second zincate immersion for about 16-20 seconds at room temperature and subsequent rinse.

The nitric acid solution used to strip the first zincate coating is generally a 50% by volume solution with a range of concentration being generally about 350 to 600 g/l, and preferably about 450 to 550 g/l. The nitric acid solution may or may not contain ferric ions as shown in U.S. Pat. No. 5,141,778 and may be employed at any suitable temperature, usually about 20° to 25° C. or higher and preferably 21° to 23° C. Immersion times may vary from about 30 to 90 seconds and preferably about 40 to 60 seconds.

While any suitable metal may now be plated on the zinc coated aluminum, the following description will be specifically directed to electroless nickel because of its commercial importance.

Electroless nickel plating compositions for applying the nickel coatings are well known in the art and plating processes and compositions are described in numerous publications such as U.S. Pat. Nos. 2,935,425; 3,338,726; 3,597,266; 3,717,482; 3,915,716; 4,467,067; 4,466,233 and 4,780,342. Other useful compositions for depositing nickel and its alloys are disclosed in the Metal Finish Guidebook and Directory Issue 1992, Vol. 90, No. 1A, pages 350-360. Each of the foregoing patents and publications are included herein by reference.

In general, ENP deposition solutions comprise at least four ingredients dissolved in a solvent, typically water. They are (1) a source of the nickel ions, (2) a hypophosphite reducing agent, (3) an acid or hydroxide pH adjuster to provide the required pH and (4) a complexing agent for metal ions sufficient to prevent their precipitation in solution. A large number of suitable complexing agents for ENP solutions are described in the above noted publications. It will be appreciated by those skilled in the art that the nickel, or other metal being applied, is usually in the form of an alloy with the other materials present in the bath. Thus, if hypophosphite is used as the reducing agent, the deposit will contain nickel and phosphorus. Similarly, if an amine borane is employed, the deposit will contain nickel and boron as shown in U.S. Pat. No. 3,953,654, supra. Thus, use of the term nickel includes the other elements normally deposited therewith.

The nickel ion may be provided by the use of any soluble salt such as nickel sulfate, nickel chloride, nickel acetate and mixtures thereof. The concentration of the nickel in solution may vary widely and is about 0.1 to 60 g/l, preferably about 2 to 50 g/l, e.g., 4 to 10 g/l.

The reducing agent, especially for memory disks, is usually the hypophosphite ion supplied to the bath by any suitable source such as sodium, potassium, ammonium and nickel hypophosphite. The concentration of the reducing agent is generally in excess of the amount sufficient to reduce the nickel in the bath.

The ENP baths are usually acid with the pH of the bath being about 4 to 6 with especially 4.4-4.8 being preferred. As noted above, pH has been found to effect enhancement of the retention of the paramagnetic properties of the deposit and, for example, adjusting the pH from 4.6 to 4.2 (using $H_2SO_4$) of an ENPLATE ADP-300 bath provided such enhanced properties. For certain applications, a pH below about 4.4 is preferred, e.g., 4-4.4.

The complexing agent may be selected from a wide variety of materials such as those containing anions such as acetate, citrate, glycollate, lactate, malate, pyrophosphate and the like, with mixtures thereof being suitable. Ranges for the complexing agent, based on the anion, may vary widely, for example, about 1 to 300 g/l, preferably about 5 to 50 g/l.

The electroless nickel plating baths may also contain other ingredients known in the art such as buffering agents, bath stabilizers, rate promoters, brighteners, etc.

The invention is to use an ENP plating bath containing antimony ions and/or cadmium ions in an amount of about 0.1 to 20 ppm or higher to plate a thin coating, or even the desired thickness coating, on the zincated aluminum substrate. It has been found that this process provides an ENP plated aluminum substrate in which the ENP will have enhanced retention of its original paramagnetic properties after exposure to heating such as in sputtering operations which coat the disk with a finish layer of cobalt or other material. In general, it is important that the ENP plating remain substantially paramagnetic and, in particular, that the completed metallized aluminum substrate article retain its desired magnetic properties at temperatures above 290° C., typically about 300° to 315° C. for exposure times up to about 12 minutes, typically about 5 to 10 minutes.

As noted above, the zinc coated aluminum part may be plated with the electroless nickel-additive containing bath to the desired final thickness. Preferably, the part is immersed in the bath to plate a thin (strike) coating adequate to provide a suitable base for the thick deposits of the final ENP plate using a different electroless nickel bath. Thicknesses for the thin base coating typically range up to about 3 micrometers or higher, with 1.5 to 2.3 micrometers being preferred. An immersion time of 15 seconds to 15 minutes usually provides the desired coating depending on bath parameters. A temperature range of about 20° C. to boiling, e.g., 82°-93° C., may be employed. A preferred range is about 85° to 89° C.

The next step in the preferred procedure is to complete the nickel plating to the desired thickness and physical characteristics by immersing the nickel coated part in another ENP plating bath (which may be any conventional plating bath and which does not have to contain the additive of the invention or be pH adjusted, but which may for certain applications) which is maintained over a temperature range of about 20° to 100° C., preferably 82° to 93° C., e.g., 85° to 89° C. A thickness up to 130 micrometers or higher may be employed, with a range of about 12–25 or 50 micrometers being used for most applications. When this strike bath process is used, it is preferred not to rinse the strike coated substrate before immersing the substrate in the next plating bath.

It is hypothesized that the thermo-magnetic stability of the ENP deposit is due to the initial interaction of the aluminum-zinc interface with the additive in the bath (antimony) producing a thin deposit which contains antimony. This deposit is obtained by preferential displacement of zinc and aluminum by antimony and nickel and this new interface becomes the active zone for ENP deposition. This thin (strike) interface has less magnetic nickel than conventional ENP deposits and results in enhanced retention of original paramagnetic properties.

The antimony ions may be +3 ions or +5 ions and may be provided by the use of any soluble antimony source such as potassium antimony tartrate. It is important to control the antimony concentration to obtain the retention of the paramagnetic properties of the ENP coating and an effective level of about 0.1 to 20 ppm, preferably 1 to 10 ppm and most preferably 3 to 7 ppm may suitably be employed. Antimony in electroless nickel plating baths and the use of the bath to plate an aluminum surface is described in U.S. Pat. No. 2,884,344.

Antimony ions, are the preferred additive to the bath for the invention. Cadmium ions may also be employed at levels of about 0.1–1 ppm and may similarly be provided by any soluble cadmium source such as cadmium sulfate.

It will be appreciated by those skilled in the art that the rate of plating may be influenced by many factors including (1) pH of the plating solution, (2) concentration of reductant, (3) temperature of the plating bath, (4) concentration of soluble nickel, (5) ratio of the volume of bath to the area plated, (6) presence of soluble fluoride salts (rate promoters) and (7) presence of wetting agents and/or agitation, and that the above parameters are only provided to give general guidance for practicing the invention; the invention residing in the use of an antimony and/or cadmium containing ENP plating bath as herein before described and/or using a bath having a reduced pH, preferably below about 4.4, to provide the enhanced paramagnetic retention properties of the ENP plating and the ENP zincated aluminum substrate memory disk article.

The compositions and process of the present invention will now be more fully illustrated by the following specific examples which are illustrative and in no way limitative and wherein all parts and percentages are by weight and temperatures in degrees Celsius unless otherwise noted.

EXAMPLE 1

CZ-46 aluminum alloy disks were double zincated and plated with ENP using the following procedure (a cold water rinse followed each of the steps):

(1) Immerse in ENBOND NS-35 for 3 minutes at 60° C.;
(2) Immerse in ACTANE E-10 for 1 minute at 60° C.;
(3) Immerse in 50% by volume $HNO_3$ for 1 minute at room temperature;
(4) Immerse in ALUMON EN for 35 seconds at room temperature;
(5) Immerse in 50% by volume $HNO_3$ for 1 minute at room temperature;
(6) Immerse in ALUMON EN for 16 seconds at room temperature;
(7) Immerse in ENPLATE ADP-300 for 1 hour at 84°-87° C., (pH 4.5±0.1).

ENPLATE® ADP-300 is sold by Enthone-OMI and is an acidic based (pH 4.6) ENP bath containing, nickel sulfate hexahydrate, sodium hypophosphite and other ingredients as discussed above.

Various materials as noted below were added to the electroless nickel bath at equivalent cation levels of 1 ppm and only the antimony +3 and cadmium +2 containing baths provided deposits which showed enhanced retention of its original paramagnetic properties after being heated at 310° C. for 1, 5 and 10 minute periods. Antimony +3 ions substantially maintained its original paramagnetic properties and had no significant effect on the plating properties of the bath. All plated samples of similar size and deposit thicknesses were tested for magnetic properties using the same procedure which comprised measuring the distance the sample moved when exposed to a magnetic field with the results being confirmed by VSM (Vibrating Sample Magnetometer). Materials tested included a control (no addition), bismuth (+3), palladium (+2), selenium (+4), lead (+2), tin (+2 and +4), cobalt (+2), copper (+2), molybdenum, zinc (+2), iron (+2), boron (+3) and ruthenium (+2).

EXAMPLE 2

EXAMPLE 1 was repeated except that the immersion times of the zincating steps (4) and (6) immersion times were reduced to 10 and 2 seconds, respectively, to produce a foil instead of an aluminum plated article. Thus, after plating, the nickel plating was peeled from the aluminum substrate, heated and tested as above. The results were again essentially the same as noted above.

EXAMPLE 3

EXAMPLE 1 was repeated except that the disks were plated for only 1 minute (step 7). This produced a thin (strike) coating of about 1000 Angstroms. which was analyzed for the chemical composition of the different layers of the coating by Auger Electron Spectroscopy. The results show that the antimony containing bath affects the chemical composition of the layers of plating with less nickel being present in each of the layers when the antimony containing bath is used.

It will thus be seen that the objects set forth above, among those made apparent from the preceding description, are efficiently attained and, since certain changes may be made without departing from the spirit and scope of the invention, it is intended that all matter contained in the above description shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. A method for depositing an electroless nickel-phosphorus paramagnetic metal coating on a zincated aluminum substrate wherein retention of the original paramagnetic property of the metal coating on the substrate after exposure to elevated temperatures is enhanced comprising plating the zincated aluminum substrate using an electroless nickel-phosphorus paramagnetic metal plating bath comprising (1) a source of nickel ions, (2) a hypophosphite reducing agent, (3) an acid or hydroxide pH adjuster to provide the required pH and (4) a complexing agent for metal ions sufficient to prevent their precipitation in solution and containing an effective amount of an additive material selected from the group consisting of antimony ions and cadmium ions.

2. The method of claim 1 wherein the electroless nickel-phosphorus metal plating bath is acidic.

3. The method of claim 2 wherein the additive is antimony +5 and is in an amount in the bath of about 1 to 20 ppm.

4. The method of claim 2 wherein the additive is antimony +3 and is in an amount in the bath of about 1 to 20 ppm.

5. The method of claim 1 wherein the nickel-phosphorus metal plating on the zincated substrate is a thin coating of metal, which coating is then plated to the desired thickness with a second electroless nickel-phosphorus metal plating bath with or without the additive material.

6. The method of claim 5 wherein the electroless nickel-phosphorus metal plating bath used to plate the thin coating of metal is an acidic bath.

7. The method of claim 6 wherein the second bath used to plate the substrate to the desired thickness is an acidic electroless nickel-phosphorus bath.

8. The method of claim 7 wherein the second metal plating bath contains antimony ions.

9. A method for depositing an electroless nickel-phosphorus paramagnetic metal coating on a zincated aluminum substrate wherein retention of the original paramagnetic property of the metal coating on the substrate after exposure to elevated temperatures is enhanced comprising plating the zincated aluminum substrate using an electroless nickel-phosphorus paramagnetic metal plating bath comprising (1) a source of nickel ions, (2) a hypophosphite reducing agent, (3) an acid or hydroxide pH adjuster to provide the required pH and (4) a complexing agent for metal ions sufficient to prevent their precipitation in solution and adjusting the pH of the bath to a value of about 4–4.4 to provide said enhanced retention of paramagnetic properties.

10. The method of claim 9 wherein the plating bath also contains antimony ions and/or cadmium ions.

11. The method of claim 10 wherein the bath contains antimony +3 ions.

12. The method of claim 9 wherein the bath contains antimony +5 ions.

13. The method of claim 9 wherein the nickel-phosphorus metal coating on the zincated substrate is a thin coating, which coating is then plated to the desired thickness with a second electroless nickel-phosphorus metal plating bath.

14. The method of claim 13 wherein the second metal plating bath contains antimony ions.

15. The method of claim 9 wherein the bath contains antimony +3 ions.

* * * * *